(12) United States Patent
Doong et al.

(10) Patent No.: US 6,789,929 B1
(45) Date of Patent: Sep. 14, 2004

(54) LAMP STRUCTURE

(75) Inventors: Tair Jiuh Doong, Taipei Hsien (TW); Cheng Ping Hsieh, Taipei Hsien (TW)

(73) Assignee: DJ Auto Components Corp., Tao-Yuan Hsien (TW)

( * ) Notice: Subject to any disclaimer, the term of this patent is extended or adjusted under 35 U.S.C. 154(b) by 232 days.

(21) Appl. No.: 10/238,731

(22) Filed: Sep. 11, 2002

(51) Int. Cl.[7] .............................. B60Q 1/00; B60Q 1/54
(52) U.S. Cl. ........................... 362/511; 362/27; 362/31; 362/538; 362/539; 362/543; 362/544; 362/551
(58) Field of Search .............................. 362/511, 27, 31, 362/538, 539, 543, 544, 551

(56) References Cited

U.S. PATENT DOCUMENTS 4,949,226 A * 8/1990 Makita et al. .............. 362/538
6,107,916 A * 8/2000 Beck et al. .................. 340/468

* cited by examiner

*Primary Examiner*—Stephen Husar
*Assistant Examiner*—James W Cranson
(74) *Attorney, Agent, or Firm*—Bacon & Thomas PLLC

(57) ABSTRACT

A lamp structure is constructed to include a transparent opencell housing with a predetermined wall thickness, the housing comprising an inner mirror layer and an outer mirror layer respectively coated on the inner and outer surfaces thereof, a light admitting face in the outside peripheral rim thereof neighboring the mirror layers, and a light source installed in a lamp socket formed integral with the housing and controlled to emit light into the predetermined wall thickness, for enabling light rays to be mutually reflected between the mirror layers and guided toward the light admitting face in the outside peripheral rim of the housing to form a light ring.

10 Claims, 6 Drawing Sheets

LAMP STRUCTURE

BACKGROUND OF THE INVENTION

1. Field of the Invention

The present invention relates to a lamp structures and, more particularly, to a lamp structure with an opencell housing that can provide a light ring in the outside peripheral rim thereof. The lamp structure of the present invention is applicable to car lamps, home lamps, commercial lamps, military lamps, agricultural lamps, as well as industrial lamps for illumination, decoration, or warning purpose.

2. Description of Related Art

A conventional headlamp assembly 9, as shown in FIG. 8, comprises a headlamp housing 91 and a light guide ring 92 located on the rim of the housing 91. As illustrated in FIG. 9, the light guide ring 92 has a plurality of notches 921 spaced around the periphery. When light rays passed through the fiber optic 922 into the distributor 923, the reflectors 924 and 925 reflect light rays into the inside of the light guide ring 92, enabling light rays to pass out of the light guide ring 92 through two opposite sloping faces of each notch 921. Because the notches 921 are arranged in a circle, a light-ring is produced when light rays passed through the notches 921. In order to produce such a light-ring around the rim of the housing 91, the light guide ring 92 and the fiber optic 922 or other light emitting means must be additionally added to the housing 91. This structure of headlamp assembly 9 is too complicated. The installation cost of the fiber optic 922 is extremely high. Furthermore, the lighting mode of this structure of headlamp assembly 9 is only ON or OFF which is monotonous. Because the light admitting part of the light guide ring 92 is limited to the area of the un-continuous notches 921, the lighting mode is monotonous, and the intensity of light passing through the notches 921 is weak.

Therefore, it is desirable to provide a lamp structure that eliminates the aforesaid drawbacks.

SUMMARY OF THE INVENTION

The present invention has been accomplished under the circumstances in view. It is the main object of the present invention is to provide a lamp structure, which is easy and inexpensive to manufacture. It is another object of the present invention to provide a lamp structure, which is flexible and practical for use in a variety of lamp applications.

To achieve these and other objects of the present invention, the lamp structure comprises a housing, a first mirror layer, a second mirror layer, and at least one first light source. The housing is a transparent opencell housing with a predetermined wall thickness. The housing comprises a first surface and a second surface at two sides of the predetermined wall thickness, a light admitting face formed in an outside peripheral wall of the housing and neighboring the first surface and the second surface, and at least one first lamp socket integral with the housing. The first mirror layer is coated on the first surface. The second mirror layer is coated on the second surface. The at least one first light source is respectively installed in the at least one first lamp socket and corresponding to the predetermined wall thickness, for emitting light into the predetermined wall thickness and enabling light rays mutually reflected between the first mirror layer and the second mirror layer and guided toward the light admitting face on the outside peripheral wall of the transparent opencell housing. Because the first mirror layer and the second mirror layer repeatedly mutually reflect light rays from the at least one light source to the light admitting face to form a light-ring, it is not necessary to install an additional light guide ring in the rim of the housing. Therefore, the lamp structure is simple and inexpensive.

The material for the housing can be obtained from transparent glass, transparent plastics (acrylic or the like), or any other equivalent transparent materials. The higher transparency would result in the more efficient light-ring, The first and second surfaces of the transparent housing can respectively be a free form surfaces, spherical surfaces, oval surfaces, parabolic surfaces, etc. The predetermined wall thickness of the housing can be made having a uniform thickness or unequal thickness subject to actual design required.

The first and second mirror layers can be formed of a metal coating such as chrome, aluminum, mercury, etc., by means of electroplating, vacuum coating, spray coating, or any other equivalent coating procedure.

The at least one first light source can be designed having different colors or different intensity of light. A driving mechanism may be applied to move the at least one first light source in and out of the respective lamp socket. When the at lest one first light source extended out of the respective lamp socket, the first mirror layer reflects light rays from the at least one first light source directly toward the outside of the housing for illumination. When the at least one light source received inside the respective lamp socket, the first mirror layer and the second mirror layer mutually reflect light rays of the at least one first light source toward the light admitting face, producing alight-ring. The driving mechanism can be a gear and rack transmission mechanism, a solenoid, an air cylinder, a hydraulic cylinder, and any suitable mechanism capable of reciprocating the at least one first light source.

The light admitting face can be a polished face, or frosted, colored, patterned face, or partitioned into several concentric rings, or any other predetermined design.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
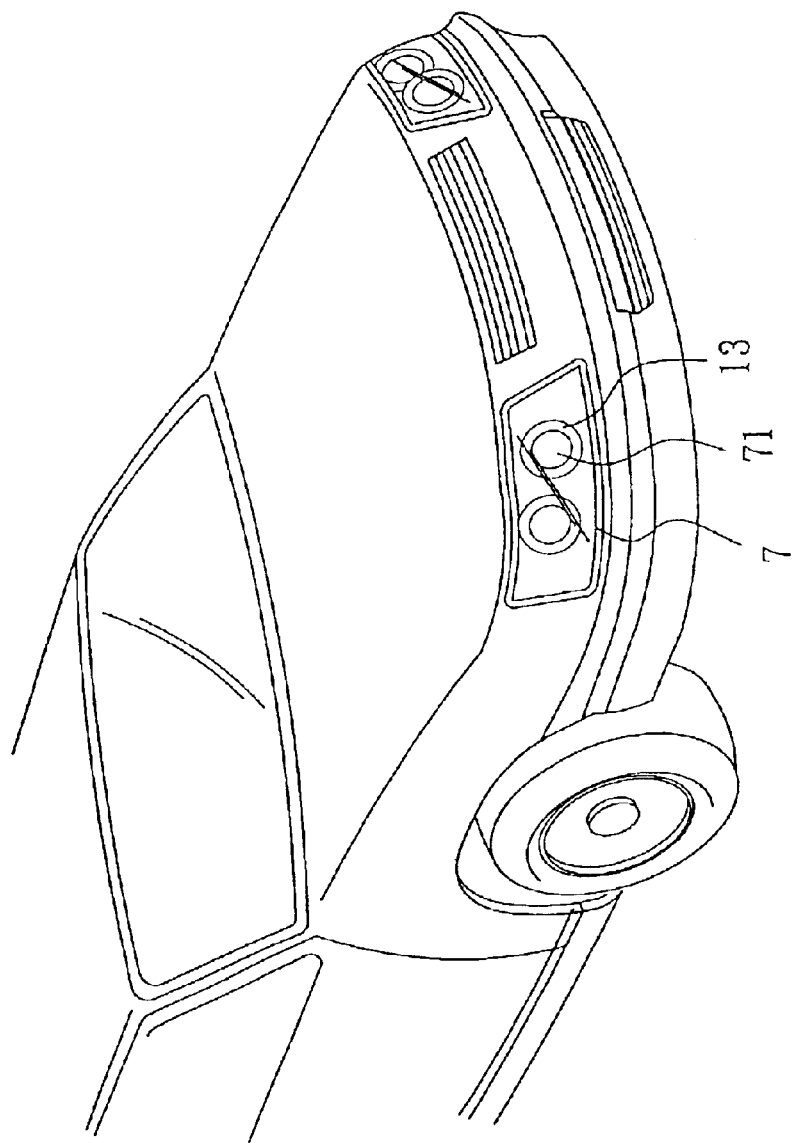
FIG. 1 in an applied view of the present invention, showing the lamp structure provided in the headlamp assembly of a car.

FIG. 1 illustrates the present invention employed to a headlamp assembly 7 for a car.

Figure 2:
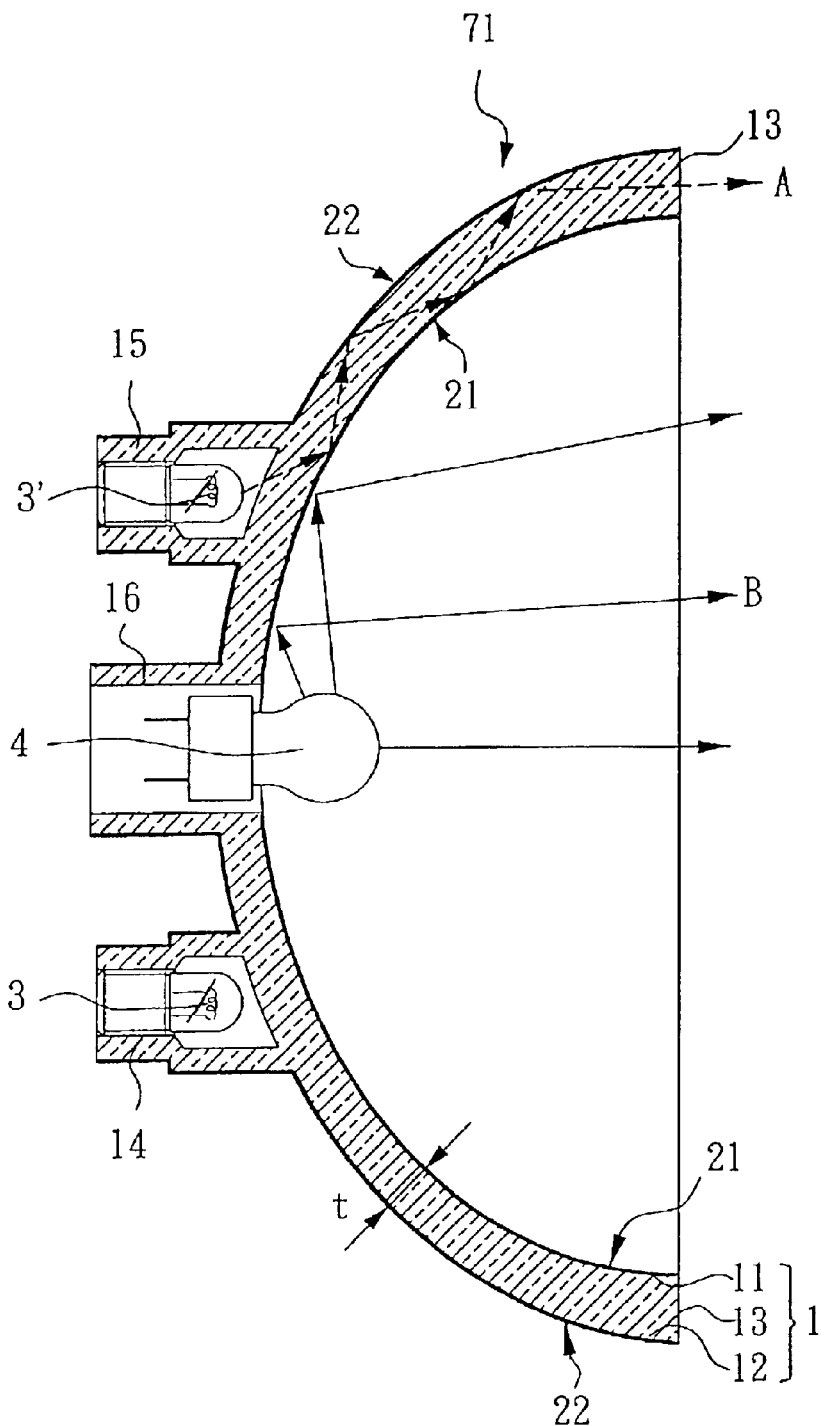
FIG. 2 is a sectional view of a lamp structure according to one embodiment of the present invention.
Figure 3:
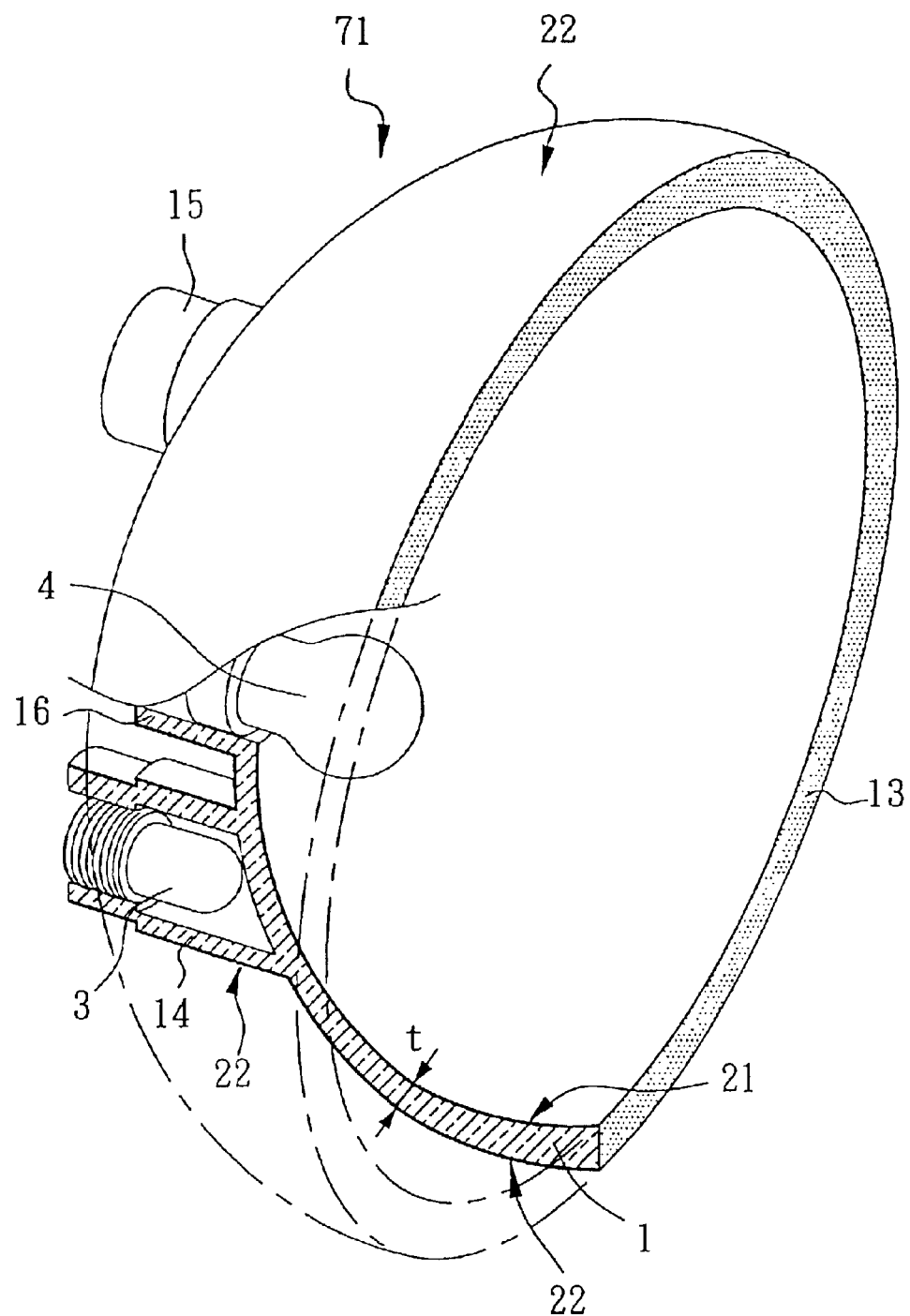
FIG. 3 is a perspective view of the lamp structure shown in FIG. 2.

Referring to FIGS. 2 and 3 and FIG. 1 again, each lamp structure 71 of the headlamp assembly 7 is comprised of a transparent housing 1, an inner mirror layer 21, an outer mirror layer 22, a main lamp 4, and two parking lamps 3 and 3'. The transparent housing 1 is an opencell housing made of transparent glass for the advantage of high temperature resistance, having a predetermined wall thickness t. FIG. 2 shows the wall thickness of the transparent housing 1 is not equal at different locations. For example, the wall thickness t of the transparent housing 1 near the outside peripheral rim is relatively thicker, forming a relatively greater area of light admitting face 13. The light admitting face 13 neighbors upon the inner mirror layer 21 and outer mirror layer 22 respectively covering the inner surface 11 and outer surface 12 of the transparent housing 1. The inner and outer surfaces 11 and 12 are designed subject to free form surface to meet vehicle safety regulation.

The transparent housing 1 has a main lamp socket 16 backwardly protruded from the outer surface 12 near the center area thereof for holding the main lamp 4. The main lamp 4 projects through the inner mirror layer 21 into the inside space of the transparent housing 1. Therefore, the inner mirror layer 21 reflects light rays B from the main lamp 4 toward the front side of the lamp structure 71 for mainly illumination.

Figure 4:
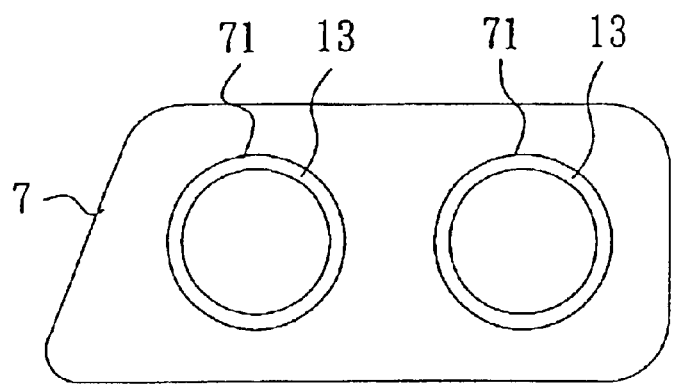
FIG. 4 is a front view of the lamp structure according to the present invention.

The main feature of the present invention is outlined hereinafter. The transparent housing 1 has two auxiliary lamp sockets 14 and 15 backwardly protruded from the outer surface 12 at two sides relative to the main lamp socket 16 for holding the parking lamps 3 and 3' respectively in positions corresponding to the predetermined wall thickness t. The inner and outer surfaces 11 and 12 of the transparent housing 1 are respectively covered with a layer of chrome by a well-known vacuum coating procedure, forming the aforesaid inner mirror layer 21 and outer mirror layer 22. When the driver turned on the parking lamps 3 and 3', light rays A of the parking lamps 3 and 3' emit into the wall thickness t and are repeatedly mutually reflected between the inner mirror layer 21 and the outer mirror layer 22. At final, light rays A of the parking lamps 3 and 3' pass through the transparent glass of the housing 1 and are guided toward the light admitting face 13 on the outside peripheral wall of the transparent housing 1, forming a light ring 13 (see FIG. 4). According to this embodiment, the light admitting face 13 is frosted to soften light passing through. Alternatively, the light admitting face 13 can be a polished face that enables light rays A to pass directly.

Because the aforesaid lamp structure 71 is simple, it is easy and inexpensive to manufacture. Furthermore, the parking lamps 3 and 3' can have different colors, or provide different intensity of light, which are flexible and practical for use in a variety of lamp applications.

Figure 5:
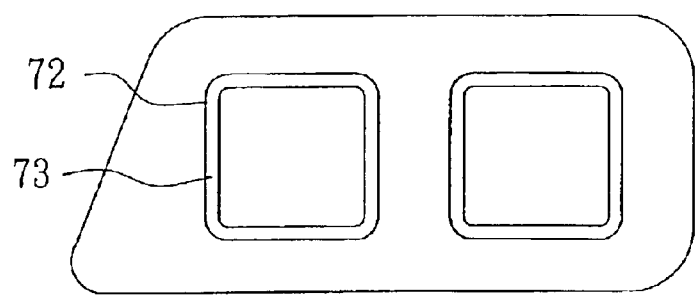
FIG. 5 is a front view of an alternate form of the lamp structure according to the present invention.

FIG. 5 shows an alternate form of the present invention. According to this alternate form, the light admitting face 73 of the lamp structure 72 has a rectangular peripheral profile for producing a rectangular loop of light.

Figure 6:
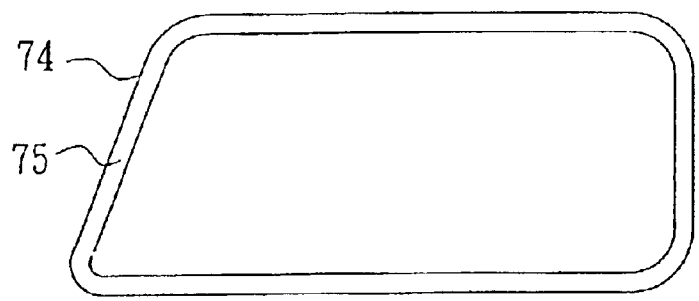
FIG. 6 is a front view of another alternate form of the lamp structure according to the present invention.

FIG. 6 shows another alternate form of the present invention. According to this embodiment, the lamp forms its transparent housing integral with the whole headlamp assembly 74 as an unit. Therefore, the light admitting face 75 of the headlamp assembly 74 has a trapezoidal profile matching with the styling of the sedan.

Figure 7:
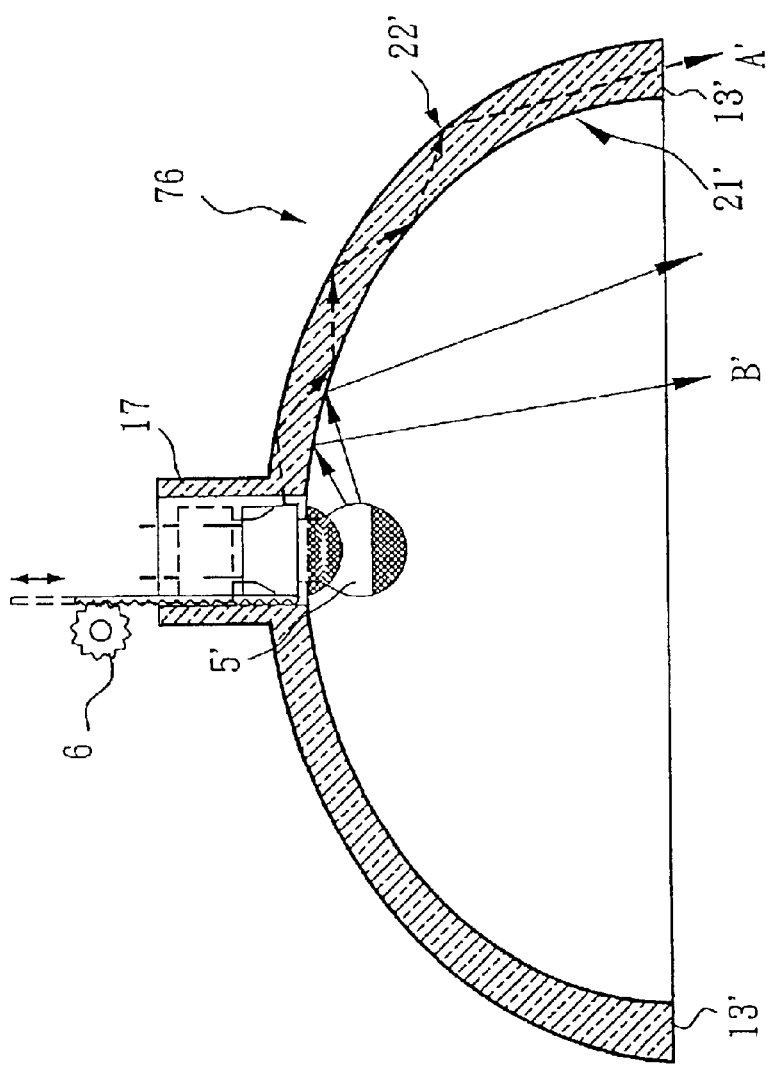
FIG. 7 is a sectional view of still another alternate form of the lamp structure according to the present invention.
Figure 8:
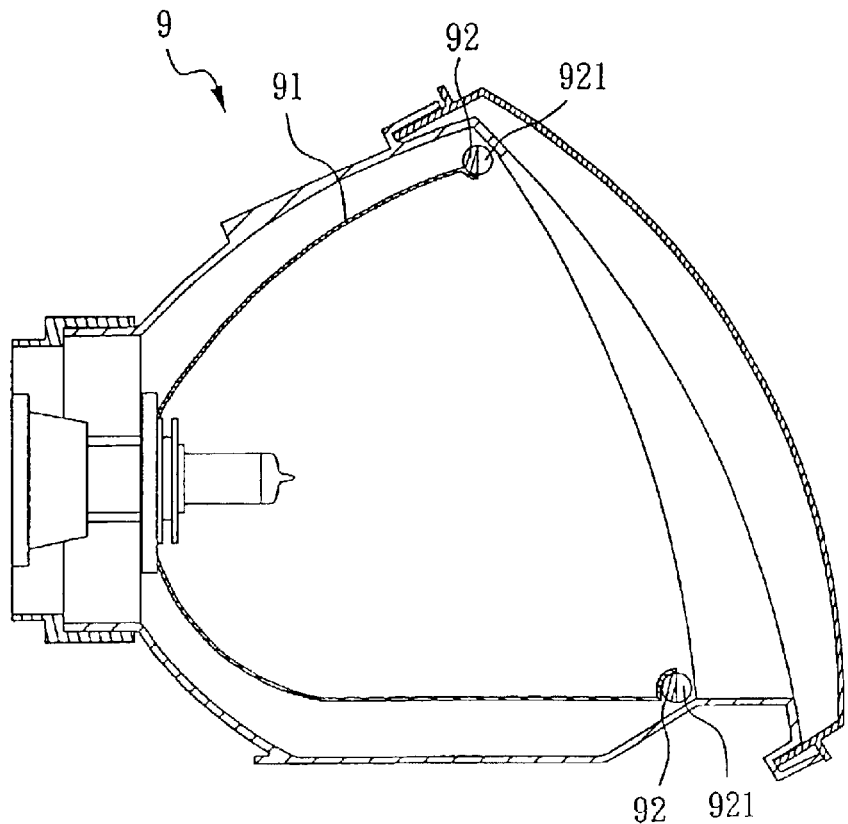
FIG. 8 is a sectional view of a headlamp assembly constructed according to the prior art.
Figure 9:
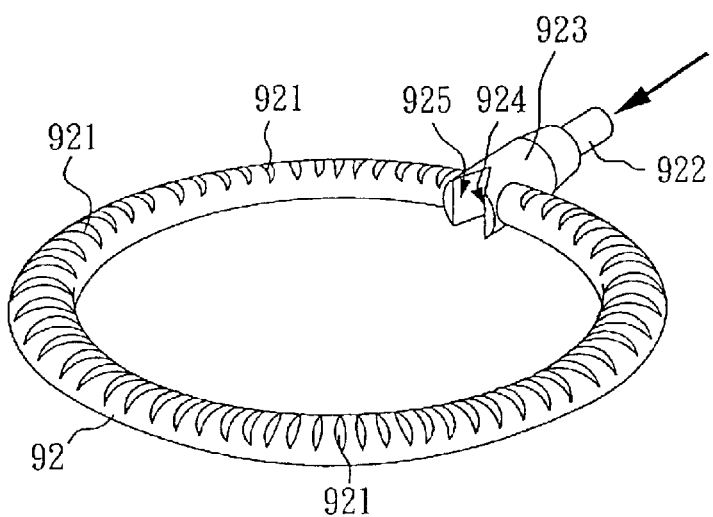
FIG. 9 is a perspective view of a conventional headlamp light guide ring.

FIG. 7 shows still another alternate form of the present invention. According to this embodiment, the lamp structure 76 is designed for a lampshade used at home. As illustrated, the center through hole of the main lamp socket 17 pierced the inner mirror layer 21'. There is no any other sub-lamp installed in this embodiment except the main lamp 5'. When the main lamp 5' moved axially forwards out of the main lamp socket 17 over the inner mirror layer 21' to the inside space of the lamp structure 76 by the gear and rack mechanism 6, light rays B' of the main lamp 5' are reflected by the inner mirror layer 21' toward the front side of the lamp structure 76 for illumination. However, when the main lamp 5' moved axially backwards to the inside of the main lamp socket 17, light rays A' of the main lamp 5' emit into the wall thickness of the transparent housing of the lamp structure 76 and repeatedly mutually reflected between the inner mirror layer 21' and the outer mirror layer 22'. At final, light rays A' of the main lamp 5' pass through the transparent housing and direct to the light admitting face 13' in the outside peripheral wall of the lamp structure 76, forming an annulus of light. Therefore, this embodiment uses only one lamp 5' in both illumination and light-ring decoration, which are flexible and practical in use in a variety of lamp applications.

A prototype of lamp structure has been constructed with the features of FIGS. 1~7. The lamp structure functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A lamp structure comprising:
 a transparent opencell housing made of transparent material with a predetermined wall thickness, said housing comprising a first surface and a second surface at two sides of said predetermined wall thickness, a light admitting face formed in an outside peripheral wall of said housing and neighboring said first surface and said second surface, and at least one first lamp socket integral with said housing;
 a first mirror layer covering said first surface;
 a second mirror layer covering said second surface; and
 at least one first light source respectively installed in said at least one first lamp socket and corresponding to said predetermined wall thickness, for emitting light into said predetermined wall thickness and enabling light rays mutually reflected between said first mirror layer and said second mirror layer and guided toward said light admitting face on the outside peripheral wall of said transparent opencell housing.

2. The lamp structure as claimed in claim 1, wherein said transparent opencell housing further comprises a second lamp socket near the center thereof, and a second light source installed in said second lamp socket at an inner side relative to said first mirror layer such that said first mirror layer reflects light from said second light source toward the outside of the lamp structure.

3. The lamp structure as claimed in claim 1, wherein said transparent opencell housing is made of transparent glass.

4. The lamp structure as claimed in claim 1, wherein the first surface and/or the second surface of said transparent opencell housing each is a free form surface.

5. The lamp structure as claimed in claim 1, wherein the wall thickness of said peripheral wall is unequal.

6. The lamp structure as claimed in claim 1, wherein said light admitting face is frosted.

7. The lamp structure as claimed in claim 1, wherein said first mirror layer and/or said second mirror layer each is formed of a layer of chrome.

8. The lamp structure as claimed in claim 1, wherein said at least one first light source includes multiple light sources of different colors.

9. The lamp structure as claimed in claim 1, wherein said at least one first lamp socket extended through said first mirror layer; said at least one first light source coupled to a driving mechanism, which is controlled to move the coupled first light source to the inside of said transparent opencell housing over said first mirror layer for enabling said first mirror layer to reflect light from the first light source toward the outside of said transparent opencell housing.

10. The lamp structure as claimed in claim 9, wherein said driving mechanism comprises a gear and a rack meshed with said gear.

* * * * *